United States Patent [19]

Wild et al.

[11] Patent Number: 5,030,713

[45] Date of Patent: Jul. 9, 1991

[54] PROCESS FOR FRACTIONATING POLYMERS

[75] Inventors: Leslie Wild, Cincinnati; Donald C. Knobeloch, Fairfield, both of Ohio

[73] Assignee: Quantum Chemical Corporation, New York, N.Y.

[21] Appl. No.: 443,678

[22] Filed: Nov. 29, 1989

[51] Int. Cl.$^5$ .............................................. C08F 6/04
[52] U.S. Cl. .................................... 528/482; 528/491; 528/497; 528/502; 528/503
[58] Field of Search ............... 528/482, 491, 497, 502, 528/503; 210/656, 737; 260/707

[56] References Cited

U.S. PATENT DOCUMENTS 3,701,764  10/1972  Hargitay ......................... 528/482 X

OTHER PUBLICATIONS

Bergstrom et al., Investigation of the Composite Molecular Structure of LLDPE by . . . Temperature Rising Elution Fractionation, J. Applied Poly. Sci., 23, 163-171, 1979.

Usami et al., General Mechanism of Short-Chain Branching Distribution in Linear Low-Density Polyethylenes, Macromolecules, 19, 2722, 1986.

*Primary Examiner*—Fred Teskin
*Attorney, Agent, or Firm*—Kenneth D. Tremain; Gerald A. Baracka

[57] ABSTRACT

An improved process for crystallizing polymer subjected to temperature rising elution fractionation is provided. The process improves the separation of the polymer species upon elution and significantly reduces "tailing" typically observed with such fractionated species. The improvements consists of crystallizing the polymer from a dilute polymer solution outside of the column and in the absence of column packing material. Only after crystallization is the polymer combined with the column packing material. This can be accomplished by either dry-blending or by slurrying.

10 Claims, 9 Drawing Sheets

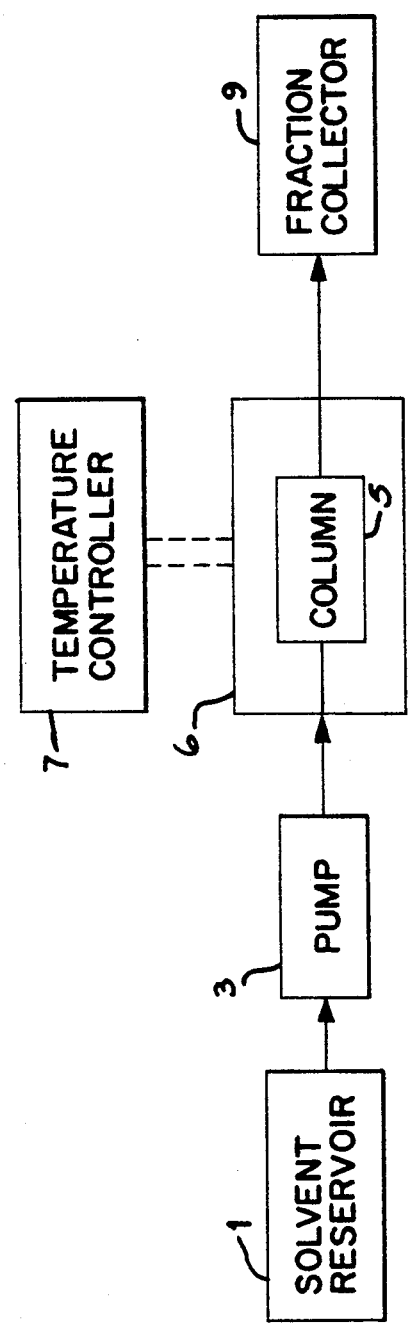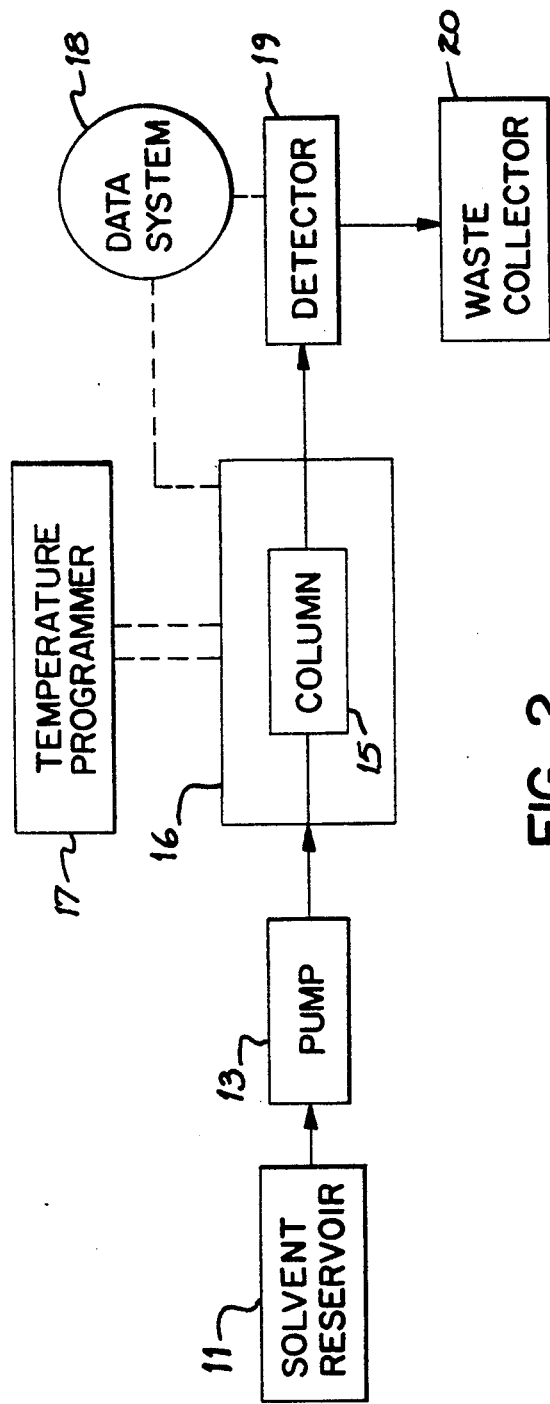

PROCESS FOR FRACTIONATING POLYMERS

BACKGROUND OF THE INVENTION

1. Field of the Invention

The present invention is directed to the fractionation of polymers based on differing crystallizability of the polymer species using the temperature rising elution technique. More specifically, it involves an improvement in the crystallization procedure. The improvement, which results in increased fractionation efficiency, i.e. improved separation of the polymer species, involves crystallizing the polymer from a dilute polymer solution outside of the column and in the absence of column packing material. The polymer crystallized in this manner is subsequently combined with a suitable column packing material, transferred to the column and eluted in accordance with established temperature rising elution fractionation procedures.

2. Description of the Prior Art

Eluting polymers from a packed column at different temperatures to achieve separation based on crystallinity was first described by Desreux et al, Bull. Soc. Chim. Belg., 59:476 (1950). The term "Temperature Rising Elution Fractionation" (TREF) was first used by Shirayama et al, J. Poly. Sci A-2, 3:906 (1965) to describe the method when employed to fractionate low density polyethylene based on the degree of short-chain branching. While TREF has been applied on a limited basis to amorphous polymers, the technique is now almost exclusively used for crystalline and semi-crystalline polymers. With the applicability of the procedure to new polymer systems and with the development of improved detection capabilities, the use of TREF has evolved from a laboratory curiosity to a sophisticated polymer analytic tool used for the routine evaluation of a variety of polymers. Interest in the technique for preparative purposes has also increased significantly in recent years.

Polymers are a composite of molecular species of varying molecular weight, chain-length, branching, crosslinking, comonomer distribution and the like. Since each molecular species influences the properties of the polymer, it follows that if the effect each species exerts on particular polymer properties can be determined, then trends can be identified which will assist the polymer scientist in designing polymers with enhanced performance characteristics. While there are a variety of procedures available to identify the molecular weight of the various molecular species, i.e. determine molecular weight distribution, techniques which can identify differences between these molecular species based on branching and other structural features are much in demand. In this regard, TREF has become increasingly important since it has the ability to separate molecular species based on any feature which exerts an influence on crystallizability.

Reported TREF procedures have entailed dissolving a crystalline or semi-crystalline polymer in an organic solvent and cooling the polymer solution in the presence of a column packing material. The precipitation/crystallization is typically carried out on the column. Whereas early workers paid little attention to the cooling step and generally used rapid precipitation or natural cooling, more recently the rate of cooling and polymer deposition have been found to significantly influence the subsequent fractionation. The crystallized polymer is then eluted from the column utilizing a suitable solvent as the temperature is raised, either incrementally or continuously at a fixed rate. In preparative TREF, the various fractions are separated and recovered for further evaluation whereas in analytical TREF the polymer is continuously monitored using an in-line detector. Typically for preparative TREF, polymer sample sizes range from about one to ten grams while in analytical TREF the polymer samples are generally less than 0.5 grams.

References which describe various analytical (A) and preparative (P) TREF procedures for the fractionation of polymers are as follows:

Shirayama et al, Supra—(P)
Wijga et al, Makromol. Schem. 36:115 (1960)—(P)
Bergstrom et al, J. Appl. Polym. Sci 23:163 (1979)—(P)
Wild et al, Polym. Preprint A.C.S. 18:182 (1977)—(A) (P)
Wild et al, J. Polym. Sci. Polym. Phys. Ed., 20:441 (1982)—(A) (P)
Usami et al, Macromols, 19:2722 (1986)—(A) (P)
Kelusky et al, Polym. Eng. Sci. 27:1562 (1982)—(A) (P)
Hazlitt et al, U.S. Pat. No. 4,798,081 (1989)—(A) (P)
Nakano et al, J. Appl. Polym. Sci., 26:4217 (1981)—(P)
Kulin et al, Pure & Appl. Chem., 60:9:1403 (1988)—(P)
Mirabella et al, J. Polym. Sci. Polym. Phys. Ed., 25:777 (1987)—(P)
Karoglanian et al, Am. Chem. Soc. Proceedings Pol. Mat. Sci. and Eng. 61:748 (1989)—(A) (P)
Kakugo et al, Macromols 21:2309 (1988)—(P)
Knobeloch et al, SPE Polyolefins IV Conference Prepr. 427 (February 1984)—(A)

While it has been observed with preparative TREF that the ability to cleanly separate the various polymer species has increased over the years due to process improvements, a lower temperature "tail" is still observed for the various fractions obtained indicating an incomplete separation of the species. This "tail" is especially significant at the lower elution temperatures and is believed to be associated with the influence of the column packing material, either in the crystallization and/or in the elution steps. This effect may also be associated with scale-up in the sample size.

It would be highly advantageous if a procedure were available, adaptable to both preparative and analytical TREF, which would minimize this "tailing"; in other words, which would give more efficient crystallization and elution. It would be even more advantageous if the procedure made it possible to conduct preparative TREF runs in shorter periods of time. By shortening the length of time required for collection of the samples, the amount of the solvent used would also be significantly reduced. These and other advantages are realized with the improved process of the present invention.

SUMMARY OF THE INVENTION

The present invention relates to an improvement in the process for fractionating a polymer containing crystallinity utilizing temperature rising elution fractionation wherein the polymer is first crystallized (precipitated) from solution over a cooling temperature gradient as a function of its crystallizability and then eluted from a packed column with an organic solvent over a heating temperature gradient. The successive fractions may be either directly analyzed or collected for isolation of the polymer.

The improvement of the invention comprises crystallizing the polymer outside of the column and in the absence of column packing material from a dilute solution containing less than 2% by weight of the polymer and thereafter combining the crystallized polymer with the column packing material at a weight ratio (polymer:support) 1:30 to 1:200. The above-described improvement is adaptable for use with both preparative and analytical TREF procedures and, with the latter, can be utilized in conjunction with any detection system.

In one aspect of the invention the crystallized polymer obtained above, i.e. from dilute solution and in the absence of the packing material, is dried and then dry-blended with the column packing material. Where this dry-blending procedure is employed, it is advantageous to employ a 15-300 micron diatomaceous earth as the column packing material.

In another aspect of the invention, the crystallized polymer obtained above is slurried with the column packing material utilizing a suitable liquid medium and filtered. This filtration can be carried out directly in the column. It is advantageous with this procedure to employ a 15-150 micron diatomaceous earth as the column packing material.

BRIEF DESCRIPTION OF THE DRAWINGS

FIG. 1 is a schematic representation of a typical preparative TREF system in block diagram form.

FIG. 2 is a schematic representation of a typical analytical TREF system in block diagram form.

DETAILED DESCRIPTION OF THE INVENTION

Figure 3:
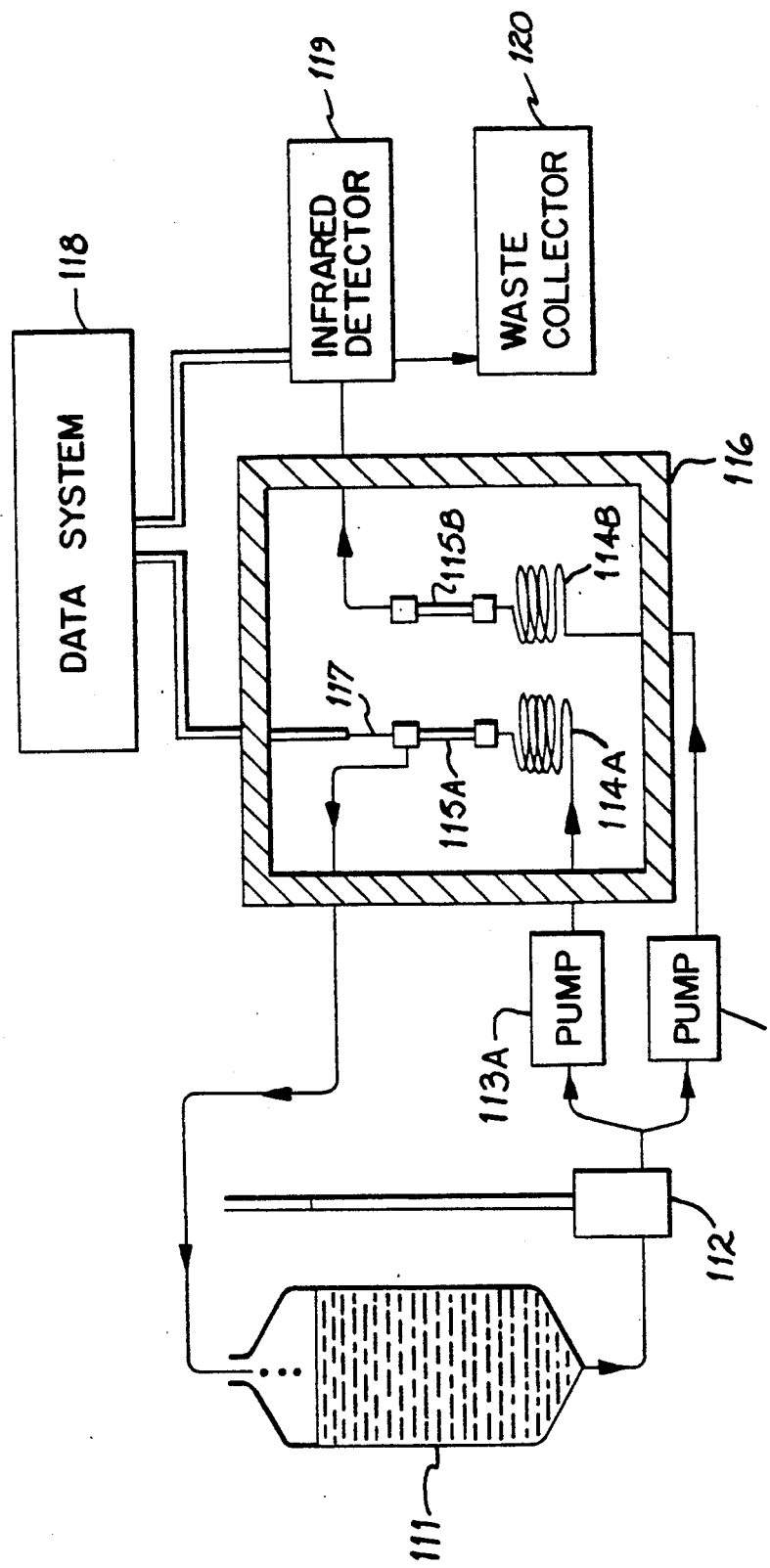
FIG. 3 is a schematic representation in block diagram form of a particularly useful analytical TREF system utilizing a reference column in conjunction with the sample column.

TREF is a highly useful method applicable to all crystalline and semi-crystalline polymers and polymer blends. It provides a convenient means to characterize the polymers by reference to distributions based on crystallinity which are the result of structural features of the polymer and provides useful information which may be related to both the synthesis of the polymer and its end-use properties. The method is particularly useful since pigments, fillers or soluble materials, including atactic polymer, do not interfere with the measurement of the crystallinity distribution.

The procedure is equally applicable to situations where the distribution results from synthesis or from blending. When a blend of different types of polymers is known or suspected, an estimate of compositions or ratio of components is possible utilizing TREF. This is possible, by manipulation of the data; even if good baseline separation is not achieved.

TREF is particularly effective for the analysis of polyolefins having varying degrees of branching. For these polyolefins, the elution temperature is calibrated in terms of degree of branching and the measured distribution is readily converted into a short-chain branching distribution. For polymers which contain highly branched species, the elution is typically carried out to sub-ambient temperatures since these highly branched species remain soluble in the solvent at room temperature.

This is necessary if a complete picture of the distribution of molecular species is to be obtained.

TREF is commonly used for the analysis of linear low density polyethylene (LLDPE) since the short-chain branching distribution presents information on comonomer distribution. It is also useful with very low density polyethylene resins (VLDPE) and with some ethylene-vinyl acetate (EVA) copolymers. Crystallinity distributions of high density polyethylene (HDPE) and polypropylene (PP) are primarily uni-modal but may show the presence of species other than the homopolymers.

More specifically for low-density polyethylene (LDPE), TREF is utilized to establish short-chain branching distribution with the objective of determining the relationship of these distributions to polymerization conditions. In the high pressure processes which are typically utilized for the preparation of LDPE and where the polymerization proceeds by a free radical mechanism, the level of short-chain branching increases with increased reaction temperature and decrease in reactor pressure. Also, long-chain branching can be formed and is controlled by temperature and pressure in a similar manner and further increases at high conversion. In view of these relationships and the wide variety of possible reactor configurations and conditions, short chain branching distributions for LDPE can vary significantly from resin to resin and a clearer understanding of these relationships is therefore desirable.

TREF analysis has also been widely utilized for LLDPE. In view of the numerous polymerization techniques which can be used to prepare LLDPE, i.e. solution, slurry or gas phase, and the wide variety of available catalysts and comonomers, there is a need to better relate these variables to polymer properties. It is highly desirable to establish realistic comonomer distributions for the various LLDPE resins produced. TREF has generated increasingly more reliable data in this regard and made it possible to clarify the relationship between structure and properties for LLDPE resins and identify molecular species where the comonomer is concentrated and which are believed to have a significant impact on polymer morphology.

TREF is also used for the analysis and identification of EVA copolymers. These copolymers, obtained by free radical polymerization processes can be thought of as modified high-pressure polyethylenes and from the standpoint of TREF analysis behave as though they are lower melting LDPE's. The effect of short-chain and long-chain branching on the structural characteristics and effects due to the incorporation of the vinyl acetate comonomer, are all well suited to characterization by TREF analysis. At higher VA contents, TREF analysis become increasingly difficult but is improved by extending operating conditions below ambient temperature to achieve more effective crystallization, separation and fractionation.

Isotactic polypropylene can also be analyzed by TREF since isotacticity is dependent on the degree of stereoregularity along the chain, i.e. the arrangement of the methyl groups on the polymer chain. Since stereoregularity is effected by the polymerization catalyst and conditions, TREF techniques can be utilized to study these relationships.

In yet another application, TREF is increasingly being used for the analysis of polymer blends. The use of blends is widespread since it permits the manufacturer to tailor the polymer end-use properties without resorting to the much more difficult approach of controlling properties through polymerization process control. Furthermore, blending makes possible the creation of materials with properties unattainable from individual polymers. TREF is useful for both quality control and the evaluation of competitive products. Analysis of blends is particularly advantageous using TREF since co-crystallization effects are negligible. It has been shown, for example, that there is excellent agreement between the calculated and actual compositions with blends of LLDPE and LDPE.

The foregoing identifies only a few of the uses of TREF and many other uses are known and described in the prior art. As improved procedures are developed, TREF techniques may extend to other polymer systems to identify and correlate structural aspects to end-use properties and synthetic methods.

The present invention resides in the particular manner in which the polymer sample is prepared for analysis and is independent of the apparatus used. The process is adaptable to both analytical and preparative TREF procedures and can be utilized with any TREF apparatus and configuration known for carrying out such analyses. In other words, it is not limited by the design of the particular TREF system being utilized.

FIG. 1 is a schematic representation of a preparative TREF arrangement which can be utilized, in block diagram form. Referring to FIG. 1, reference number 1 is a reservoir which holds the solvent utilized for the elution. Solvent reservoir 1 is connected by a line to pump 3. While it is not necessary, a means for degassing the solvent can be located in the line between 1 and 3. Pump 3 is generally equipped with a means to control the flow of the liquid being pumped and is connected to column 5 which contains the crystallized polymer being eluted and the packing material. Column 5 is contained within heating chamber 6, which can be a bath or an oven, and which is connected to temperature control 7. Eluant from column 5 is passed to collector 9 where the various fractions are retained for subsequent processing and isolation of the polymer.

FIG. 2 is a schematic representation of an analytical TREF system, in block diagram form. Referring to FIG. 2, reference numeral 11 is a solvent reservoir; 13 is a pump; 15 is a column; and 16 is the heating chamber connected to a temperature programmer 17. Eluant from column 15 in the analytical TREF system is directed through a line to detector 19. The detector can be a single detection device or a multiple unit. 18 is a data acquisition and processing system which receives and processes signals from detector 19 and column 15. After analysis, the eluant is piped to waste collector 20 for disposal.

FIG. 3 is a schematic representation of a preferred method for analytical TREF analysis. Referring to FIG. 3, reference numeral 111 identifies the solvent reservoir which is connected to degasser 112. The line from degasser 112 is split and connected to pumps 113A and 113B. Pump 113A controls the flow of the solvent through pre-heat coil 114A and reference column 115A. Pump 113B controls the flow of solvent through pre-heat coil 114B and reference column 115B which contains the crystallized polymer and packing material. The pre-heat coils (114A and 114B) and columns (115A and 115B) are connected to a programmable temperature control which is not shown. Controls are provided on pumps 113A and 113B to regulate the flow of the solvent as necessary in order to maintain equal flow rates through 115A and 115B, respectively. Solvent passed through 115A is recycled to solvent reservoir 111. Eluant from column 115B is directed to infrared detector 119. After analysis, the eluant is piped to waste collector 120 for disposal. A thermocouple 117 is inserted in reference column 115A. 118 is a data acquisition and processing system which receives and processes signals from infrared detector 119 and thermocouple 117.

Additional details regarding the design and operation of the system and collection and processing of data may be had by referring to U.S. Pat. No. 4,798,081 and to Wild et al, *J. Polym. Sci. Polym. Phys. Ed.* 20:441 (1982).

As previously indicated, preparation of the polymer sample in accordance with the improved procedure of this invention is independent of the method utilized for the elution—whether it be preparative or analytical in nature. For this invention the polymer sample is crystallized utilizing what is referred to as off-column precipitation. More specifically, crystallization is accomplished outside of the column and in the absence of column packing material from a dilute polymer solution. Only after it has been subjected to complete or essentially complete crystallization (precipitation) under a cooling temperature gradient is the polymer combined with the packing material and packed in the column. Elution of the crystallized polymer prepared as described above may then be carried out in accordance with known and recognized preparative or analytical TREF operations.

While the improved procedure of this invention can be used with any crystalline or semi-crystalline polymer, it is particularly useful with olefin homopolymer and copolymers. Illustrative polymers adaptable for use in the improved process of the invention include: polyethylenes, including high density, medium density, low density, very low density and linear low density products; isotactic polypropylenes, ethylene-propylene copolymers; ethylene-vinyl acetate copolymers; ethylene-n-butyl acrylate copolymers; ethylene-ethyl acrylate copolymers, ethylene-acrylic acid copolymers; poly(4-methylpentene); isotactic poly(butene-1); poly(ethylene terephthalate); and the like.

The polymer is dissolved in a suitable solvent to obtain a diluent polymer solution. Solvents can be any of those known to the art which are capable of dissolving the molten polymer. Illustrative solvents include xylene, toluene, ortho-dichlorobenzene, trichlorobenzene, alpha-chloronaphthalene, decalin, and the like. As will be recognized by those skilled in the art, the choice of solvent will be governed by the particular polymer being dissolved. Also, if the process is analytical TREF, the solvent must not interfere with the method of detection being used. In general, less than 2% polymer will be present in the polymer solution. It is more customary that the polymer concentration range from 0.5% to 0.001% and, more preferably, from 0.25% to 0.01%. Solution can be achieved by simply heating the polymer in the solvent with or without agitation.

The dilute polymer solution is then subjected to cooling at a controlled rate to crystallize the polymer. Control of the cooling temperature gradient is important if sharp fractionations are to be achieved. The solution is generally cooled at a rate from about 1° C. to 10° C. per hour. More commonly, cooling rates range from 1.5° C. to 5° C. per hour. The temperature range over which the polymer is cooled will vary depending on the resin but most typically runs from 120° C. down to about −20° C. For some polymers, cooling to ambient temperature may be sufficient to achieve essentially complete crystallization. After the cooling is completed, complete precipitation may be insured by the addition of a non-solvent, i.e., acetone, methanol or the like, to the cooled polymer solution.

Cooling is carried out in the absence of the column packing material. This is conveniently accomplished in any suitable container capable of holding the polymer solution. The polymer, after crystallization, may be recovered by filtration and dried or it may be combined with the packing material without being isolated from the solvent.

When the polymer is isolated and dried after crystallization, it is then dry-blended with the column packing material prior to introduction into the column. This is a convenient method, particularly for preparative TREF, where large columns are utilized and where relatively large polymer samples are involved. In the alternative procedure where the crystallized polymer is not isolated from the solvent, the column packing material is directly added to the polymer and solvent, slurried therewith, and the resulting slurry then added to the column where it is filtered to remove the solvent. This procedure is useful with both larger and smaller columns. As will be obvious to those skilled in the art, in the slurry procedure where the crystallized polymer remains in contact with the solvent, subsequent operations must be carried out at or near the lowest temperature of crystallization or a non-solvent must be added to insure that crystallized polymer does not go back into solution. It is further advantageous when utilizing this latter procedure to reduce the amount of solvent being handled in the slurrying operation by removing (decantation, siphoning or the like) the predominant amount of solvent from the system using caution so as not to remove any of the crystallized polymer. It is also especially useful to add a non-solvent to this reduced volume containing the polymer.

After combining the crystallized polymer and the support material the weight ratio of polymer to support material will range from 1:30 to 1:200 and, more preferably, from 1:50 to 1:150. While the present procedure can be utilized with any of the known and conventionally used packing materials including diatomaceous earths, glass beads, ground firebrick, sand, steel pellets and the like, it is particularly advantageous to utilize a diatomaceous earth packing material which is capable of retaining the crystallized polymer particles upon filtration as described above in the slurry procedure. Diatomaceous earths employed for this purpose typically range from 15 to 300 microns. Where the crystallized polymer is dry-blended with the support material, the diatomaceous earth support will range from 15 to 300 microns and, more preferably, from 50-250 microns. Where the crystallized polymer is slurried with the support material, the diatomaceous earth support will range from 15 to 150 microns and, more preferably, from 25 to 125 microns.

Having provided the foregoing general description of the improved off-column crystallization process of the invention, the following example describes in detail the application of the procedure to the analysis of a commercial polyethylene resin. For the example, a commercially available linear low density polyethylene obtained by polymerizing ethylene with a minor amount of butene-1 and having a density of 0.918 and melt index of 1.0 was fractionated utilizing TREF to separate and recover fractions of differing crystallinity distribution. Whereas the elution was carried out in accordance with customary TREF procedures, sample preparation, i.e., crystallization, was accomplished in accordance with the improved procedure of the present invention.

(A) SAMPLE PREPARATION (OFF-COLUMN CRYSTALLIZATION)

Eight grams of the polymer was dissolved in three liters xylene to obtain a polymer solution. Solution was achieved by heating the polymer and solvent for approximately one hour at 120° C. The solution was prepared in two batches to facilitate handling of the relatively large volume of solvent involved. The polymer solution was then transferred to a 115° C. oil bath programmed to cool the solution at a rate of 5° C. per hour and crystallize the polymer. When the lowest temperature of the oil bath (32° C.) was reached the sample was removed and allowed to cool to ambient temperature and then placed in a freezer and cooled further to 2° C. The resulting mixture was then added to an equal volume of acetone to insure that all of the polymer was precipitated and to facilitate recovery of the crystallized polymer from the large volume of solvent mixture.

The crystallized polymer was allowed to settle and all but approximately 1,000 mls. of the solvent mixture carefully decanted. The remaining precipitate/solvent mixture was combined with approximately 500 mls 80 micron (150 mesh) diatomaceous earth filter aid (Eagle-Picher Celatom ® FW-80), slurried, and collected on a filter. The resulting mixture of crystallized polymer and diatomaceous earth was washed with acetone to remove the final traces of xylene and dried overnight. The dried mixture (approx. volume 500 mls) was then dry-loaded into the top approx. 10 in. of a stainless steel fractionation column (4" diam. × 18" long). Diatomaceous earth was used to fill any excess volume of the column. The filled column containing the crystallized polymer was then connected for the preparative fractionation.

(B) ELUTION

Conventional preparative TREF apparatus was utilized for the fractionation. This consisted of an oil bath connected to a temperature controller/programmer to maintain and increase the temperature as desired. A means for circulating the oil within the bath was provided. The loaded column was placed in the bath and connected to the solvent reservoir. The line from the reservoir entered the column at the bottom and eluant was removed from the top of the column and piped to a fraction collector. A metering pump was inserted in the line between the reservoir and the column to control the flow of the solvent. Means was also provided to degas the solvent prior to pumping.

Fractionation was carried out by eluting the packed column with xylene at a series of temperatures beginning at ambient and increasing in a stepwise manner up to 110° C. For each fraction, the temperature was maintained at the predetermined maximum until all of the polymer was eluted at that temperature. This was evidenced by the fact that no precipitate was formed upon the addition of acetone to the eluant. The temperature was then increased to the next higher predetermined temperature maximum and the next fraction collected. This procedure was directed up to 110° C. Elution times typically ranged from 30–40 minutes. The polymer was recovered from each fraction by precipitation with acetone and filtration and the weight recorded after drying. The various fractions with the temperature range over which each was collected, the elution time, and the amount of polymer in each fraction were as follows:

| Fraction Number | Temperature Range (°C.) | Time to Complete Elution (mins.) | Polymer Weight (grams) |
|---|---|---|---|
| 1 | Ambient to 30° | 40 | 0.168 |
| 2 | 30–40 | 40 | 0.248 |
| 3 | 40–48 | 40 | 0.567 |
| 4 | 48–55 | 40 | 0.500 |
| 5 | 55–60 | 35 | 0.487 |
| 6 | 60–65 | 35 | 0.613 |
| 7 | 65–69 | 35 | 0.629 |
| 8 | 69–73 | 35 | 0.700 |
| 9 | 73–77 | 35 | 0.746 |
| 10 | 77–81 | 35 | 0.988 |
| 11 | 81–85 | 30 | 0.711 |
| 12 | 85–88 | 30 | 0.358 |
| 13 | 88–90 | 30 | 0.305 |
| 14 | 90–95 | 30 | 1.025 |
| 15 | 95–110 | 45 | 0.0 |

For the purpose of comparison, to demonstrate the improved fractionation obtained by the process of the present invention wherein the polymer is crystallized from a dilute polymer solution outside of the column and in the absence of column packing material, a comparative preparative fractionation was carried out. For this fractionation, conventional crystallization practice was employed wherein the polymer was precipitated from solution onto the packed column.

(C) COMPARISON SAMPLE PREPARATION (ON-COLUMN CRYSTALLIZATION)

Eight grams of the linear low density polyethylene was dissolved in 1.5 liter xylene at 120° C. The hot polymer solution was then transferred onto the packed column maintained in an oil bath at 115° C. The column was packed with Chromosorb ® P (John Mansville)—a diatomaceous earth packing material widely used for TREF because of its large surface area and its ability to pack evenly and avoid channeling during the elution. The packed column held the entire volume of the polymer solution. The oil bath was then cooled at a rate of 5° C. per hour to crystallize the polymer. When the minimum temperature of the bath (32° C.) was reached dry ice was added to the oil bath for further cooling.

(D) COMPARISON ELUTION

The packed column prepared above was then eluted and the polymer fractions recovered following the same procedure as described in (B). Temperature steps were programmed to be identical to those of (B). The elution time required to collect each fraction and weight of polymer obtained for each fraction were as follows:

| Fraction Number | Time to Complete Elution (mins.) | Polymer Weight (grams) |
|---|---|---|
| Comparison 1 | 75 | 0.075 |
| Comparison 2 | 75 | 0.075 |
| Comparison 3 | 75 | 0.085 |
| Comparison 4 | 75 | 0.067 |
| Comparison 5 | 70 | 0.161 |
| Comparison 6 | 70 | 0.344 |
| Comparison 7 | 70 | 0.370 |
| Comparison 8 | 70 | 0.718 |
| Comparison 9 | 70 | 0.620 |
| Comparison 10 | 70 | 0.975 |
| Comparison 11 | 65 | 1.179 |
| Comparison 12 | 65 | 0.902 |
| Comparison 13 | 65 | 0.765 |
| Comparison 14 | 65 | 1.071 |
| Comparison 15 | 90 | 0.170 |

An advantage of the improved procedure of the present invention is apparent even at this stage in the process. In the comparative elution (D) the times required to achieve complete elution of the polymer from the column over the various temperature ranges were significantly longer—more than twice as long in some instances, than with elution (B) where the column was prepared in accordance with the process of this invention. Since the solvent is pumped at a constant rate, any increase in the elution time results in a proportionate increase in the amount of solvent used. The ability of the invention to reduce the elution time and solvent consumption for preparative fractionations is unexpected and by itself a significant improvement.

The "sharpness" of the fractionation, i.e., separation of molecular species based on differing crystallinity resulting from differences in the degree of branching, obtained with the above-described preparative TREF procedures was evaluated by analyzing the polymer isolated from each of the fractions obtained from elution (B) and comparative elution (D). The analysis was conducted utilizing analytical TREF (ATREF) as it is a convenient and rapid procedure for determining crystallinity distribution.

The arrangement of the apparatus used to conduct the ATREF analysis is shown in FIG. 1. The apparatus utilized a programmable chromatographic oven module (Hewlett Packard Model 5890A) housing a sample column and a reference column. The columns were 2¼"×⅜" diameter (O.D.) stainless steel with a 1/16" wall thickness. The reference column was packed with Eagle Picher Celatom ® FW-80 (150 mesh) diatomaceous earth and had a thermocouple inserted therein. This provides a means of accurately determining the column temperature as the polymer is eluted which is independent of flow rate and/or rate of temperature rise. This is a significant feature in view of lag time between the temperature in the oven and the column temperature. Both columns were connected through separate but identical lengths of tubing with identically sized pre-heat coils within the oven to a controllable mini-pump capable of providing a constant flow of solvent to the column. The pumps (The Marshall Co., Model 396-89) were connected to a solvent reservoir and had separate controls. The rate of flow within each column was independently adjusted to achieve identical flow rates. Eluant from the reference column was recycled. Eluant from the sample column was directed through heated tubing to an infrared detector (Foxboro Analytical, Wilks Miran 1A) set at the C-H stretch absorbance. Output from the infrared detector and the corresponding column temperature were transmitted to an IBM PC AT for processing and storage.

For the analysis, a 10±0.5 mg sample of the polymer obtained from each fractionation was weighed and separately combined with 10±0.2 mls technical grade xylene in a sample tube. The tube was then placed in an oven and heated for approximately 1½ hours at 125° C. After about one hour the sample tube was visually checked and swirled to facilitate solution of the polymer. When solution was complete the sample tube was removed and transferred to a heated (120° C.) circulating bath (Lauda Bath Circulator, Model No. RCS-6D with R-61 Programmable Temperature Control) for controlled cooling and crystallization of the polymer from the polymer solution. The cooling was carried out over the range 120° C. to 0° C. at a rate of 5° C. per hour. The walls of the sample tube were then scraped and rinsed with acetone to bring the sample tube volume to 20±0.5 mls.

To prepare the polymer for analysis, the sample tube was shaken to insure homogeneity and a 3 ml aliquot of the homogeneous mixture, calculated to provide 0.003 grams polymer, withdrawn and transferred to a beaker containing 1.5 mls diatomaceous earth filter aid (Eagle-Picher Celatom ® FW-80). The resulting slurry was then transferred to the column. Prior to the transfer, 1.5 mls of filter aid was added to the column and collected on the 50 micron frit located at the bottom to facilitate filtering. To facilitate packing the column, i.e. removal of the solvent, air pressure was applied by means of a pump. When the filtration of the polymer sample slurry was complete, additional diatomaceous earth filter aid was added (approx. 2 mls.) to fill the column and the contents of the column flushed with acetone. The column was then sealed and transferred to the oven module for elution.

To accommodate the infrared detector, ortho-dichlorobenzene was utilized as the solvent for the elution. The elution was carried out from ambient temperature up to 110° C. at a rate of 2° C. increase per minute. The flow rate of the ortho-dichlorobenzene through the reference column containing the thermocouple and the column containing the polymer sample was maintained at 2 mls per minute. A steady baseline was obtained before starting each run.

Signals from the thermocouple and the infrared detector were transmitted to the data system for processing. The data was normalized through the use of a calibration equation and plotted for each 0.23° C. increase in temperature as DHT/DT versus T where HT denotes the normalized cumulative height and T is the temperature. The data was also recorded on a printer. If desired, the average methyl content can also be computed in a similar operation to represent the overall degree of short-chain branching of the sample. This would be displayed in curve form by plotting DHT/DN where HT denotes the normalized cumulative height and N is the methyl content.

Each of the fractions 1–15 obtained in accordance with the procedure of the present invention, i.e., following the off-column crystallization procedure, and each of the comparison fractions 1–15 obtained in accordance with the prior art, i.e. using on-column crystallization, were analyzed and the data collected and plotted as described above. The data set forth in Table 1 below was generated for Fraction 13, is representative of the data collected for each sample analyzed.

TABLE 1

| Temp | Uncorr Height | Baseln Factor | Corr Height | Cum Height | Cum Ht PCT | Me Per 1000 C | DHT DME | Avg No Me |
|---|---|---|---|---|---|---|---|---|
| *78.98 | 1.13 | 1.13 | 0.00 | 114.52 | 100.00 | 10.02 | | |
| 79.22 | 1.16 | 1.13 | 0.03 | 114.51 | 100.00 | 9.86 | 0.02 | 9.94 |
| 79.68 | 1.18 | 1.12 | 0.08 | 114.49 | 99.97 | 9.55 | 0.07 | 9.70 |
| 79.91 | 1.31 | 1.11 | 0.10 | 114.41 | 99.91 | 9.39 | 0.43 | 9.47 |
| 80.14 | 1.21 | 1.11 | 0.10 | 114.31 | 99.82 | 9.23 | 0.57 | 9.31 |
| 80.38 | 1.18 | 1.10 | 0.10 | 114.20 | 99.73 | 9.07 | 0.56 | 9.15 |
| 80.61 | 1.17 | 1.10 | 0.13 | 114.10 | 99.64 | 8.92 | 0.56 | 9.00 |
| 80.84 | 1.32 | 1.09 | 0.20 | 113.97 | 99.52 | 8.76 | 0.74 | 8.84 |
| 81.07 | 1.36 | 1.08 | 0.27 | 113.77 | 99.35 | 8.60 | 1.10 | 8.68 |
| 81.30 | 1.40 | 1.08 | 0.32 | 113.50 | 99.11 | 8.44 | 1.50 | 8.52 |
| 81.54 | 1.48 | 1.07 | 0.35 | 113.18 | 98.83 | 8.29 | 1.80 | 8.36 |
| 81.77 | 1.38 | 1.07 | 0.36 | 112.82 | 98.52 | 8.13 | 1.96 | 8.21 |
| 82.00 | 1.45 | 1.06 | 0.36 | 112.46 | 98.21 | 7.97 | 2.00 | 8.05 |
| 82.23 | 1.46 | 1.06 | 0.39 | 112.10 | 97.89 | 7.81 | 2.01 | 7.89 |
| 82.46 | 1.45 | 1.05 | 0.46 | 111.71 | 97.55 | 7.66 | 2.16 | 7.73 |
| 82.70 | 1.53 | 1.05 | 0.54 | 111.25 | 97.15 | 7.50 | 2.55 | 7.58 |
| 82.93 | 1.78 | 1.04 | 0.60 | 110.71 | 96.67 | 7.34 | 3.01 | 7.42 |
| 83.16 | 1.71 | 1.04 | 0.61 | 110.11 | 96.15 | 7.18 | 3.31 | 7.26 |
| 83.39 | 1.56 | 1.03 | 0.63 | 109.50 | 95.62 | 7.02 | 3.40 | 7.10 |
| 83.62 | 1.66 | 1.03 | 0.67 | 108.87 | 95.07 | 6.87 | 3.48 | 6.95 |
| 83.86 | 1.88 | 1.02 | 0.77 | 108.20 | 94.48 | 6.71 | 3.72 | 6.79 |
| 84.09 | 1.86 | 1.02 | 0.91 | 107.43 | 93.81 | 6.55 | 4.25 | 6.63 |

TABLE 1-continued

| Temp | Uncorr Height | Baseln Factor | Corr Height | Cum Height | Cum Ht PCT | Me Per 1000 C | DHT DME | Avg No Me |
|---|---|---|---|---|---|---|---|---|
| 84.32 | 2.04 | 1.01 | 1.08 | 106.52 | 93.01 | 6.39 | 5.05 | 6.47 |
| 84.55 | 2.33 | 1.00 | 1.22 | 105.44 | 92.07 | 6.24 | 5.97 | 6.32 |
| 84.79 | 2.34 | 1.00 | 0.33 | 104.22 | 91.01 | 6.08 | 6.77 | 6.16 |
| 85.02 | 2.40 | 0.99 | 1.43 | 102.89 | 89.85 | 5.92 | 7.37 | 6.00 |
| 85.25 | 2.53 | 0.99 | 1.56 | 101.46 | 88.60 | 5.76 | 7.92 | 5.84 |
| 85.48 | 2.61 | 0.98 | 1.73 | 99.90 | 87.23 | 5.61 | 8.64 | 5.68 |
| 85.71 | 3.04 | 0.98 | 1.91 | 98.17 | 85.73 | 5.45 | 9.56 | 5.53 |
| 85.95 | 3.04 | 0.97 | 2.11 | 96.26 | 84.06 | 5.29 | 10.60 | 5.37 |
| 86.18 | 3.22 | 0.97 | 2.31 | 94.15 | 82.21 | 5.13 | 11.71 | 5.21 |
| 86.41 | 3.52 | 0.96 | 2.49 | 91.83 | 80.19 | 4.98 | 12.81 | 5.05 |
| 86.64 | 3.69 | 0.96 | 2.65 | 89.35 | 78.02 | 4.82 | 13.78 | 4.90 |
| 86.87 | 3.73 | 0.95 | 2.84 | 86.70 | 75.71 | 4.66 | 14.68 | 4.74 |
| 87.11 | 4.03 | 0.95 | 3.11 | 83.85 | 73.22 | 4.50 | 15.74 | 4.58 |
| 87.34 | 4.43 | 0.94 | 3.50 | 80.74 | 70.51 | 4.34 | 17.23 | 4.42 |
| 87.57 | 5.06 | 0.93 | 4.05 | 77.24 | 67.45 | 4.19 | 19.41 | 4.27 |
| 87.80 | 5.47 | 0.93 | 4.73 | 73.19 | 63.91 | 4.03 | 22.42 | 4.11 |
| 88.03 | 6.53 | 0.92 | 5.52 | 68.46 | 59.78 | 3.87 | 26.22 | 3.95 |
| 88.27 | 7.35 | 0.92 | 6.38 | 62.93 | 54.96 | 3.71 | 30.60 | 3.79 |
| 88.50 | 7.95 | 0.91 | 7.23 | 56.55 | 49.39 | 3.56 | 35.33 | 3.64 |
| 88.73 | 8.77 | 0.91 | 7.92 | 49.32 | 43.07 | 3.40 | 40.05 | 3.48 |
| 88.96 | 9.29 | 0.90 | 8.20 | 41.41 | 36.16 | 3.24 | 43.85 | 3.32 |
| 89.19 | 8.99 | 0.90 | 7.91 | 33.21 | 29.00 | 3.08 | 45.43 | 3.16 |
| 89.43 | 8.05 | 0.89 | 7.03 | 25.30 | 22.09 | 2.93 | 43.80 | 3.00 |
| 89.66 | 6.54 | 0.89 | 5.73 | 18.27 | 15.96 | 2.77 | 38.91 | 2.85 |
| 89.89 | 5.17 | 0.88 | 4.28 | 12.55 | 10.95 | 2.61 | 31.72 | 2.69 |
| 90.12 | 3.68 | 0.88 | 2.94 | 8.27 | 7.22 | 2.45 | 23.70 | 2.53 |
| 90.36 | 2.70 | 0.87 | 1.89 | 5.32 | 4.65 | 2.29 | 16.30 | 2.37 |
| 90.59 | 1.94 | 0.86 | 1.16 | 3.44 | 3.00 | 2.14 | 10.45 | 2.22 |
| 90.82 | 1.63 | 0.86 | 0.73 | 2.27 | 1.98 | 1.98 | 6.44 | 2.06 |
| 91.05 | 1.30 | 0.85 | 0.49 | 1.54 | 1.34 | 1.82 | 4.06 | 1.90 |
| 91.28 | 1.27 | 0.85 | 0.34 | 1.05 | 0.91 | 1.66 | 2.73 | 1.74 |
| 91.52 | 1.12 | 0.84 | 0.22 | 0.71 | 0.62 | 1.51 | 1.89 | 1.59 |
| 91.75 | 0.95 | 0.84 | 0.13 | 0.49 | 0.43 | 1.35 | 1.20 | 1.43 |
| 92.44 | 0.83 | 0.82 | 0.09 | 0.36 | 0.31 | 0.88 | 0.24 | 1.11 |
| 92.68 | 0.93 | 0.82 | 0.11 | 0.27 | 0.23 | 0.72 | 0.52 | 0.80 |
| 92.91 | 0.97 | 0.81 | 0.16 | 0.16 | 0.14 | 0.56 | 0.61 | 1.64 |
| *93.14 | 0.81 | 0.81 | 0.00 | 0.00 | 0.00 | 0.40 | 0.87 | 0.48 |

*baseline curve start and end points were used to determine the baseline
Average number methyl groups per 1000 carbon atoms = 3.95
CW = 4.03
CN = 3.59
CW/CN = 1.12

Figure 4:
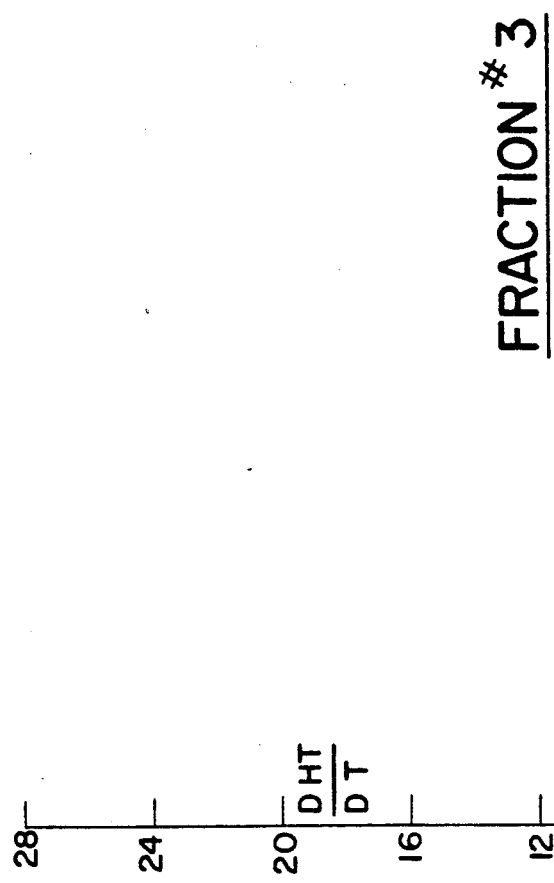
FIG. 4 is a graph of distribution data obtained for LLDPE fractions obtained by preparative TREF over the elution range 40°-48° C. The ordinate is the output from the detector (DHT/DT) and the abscissa is the elution temperature.
Figure 5:
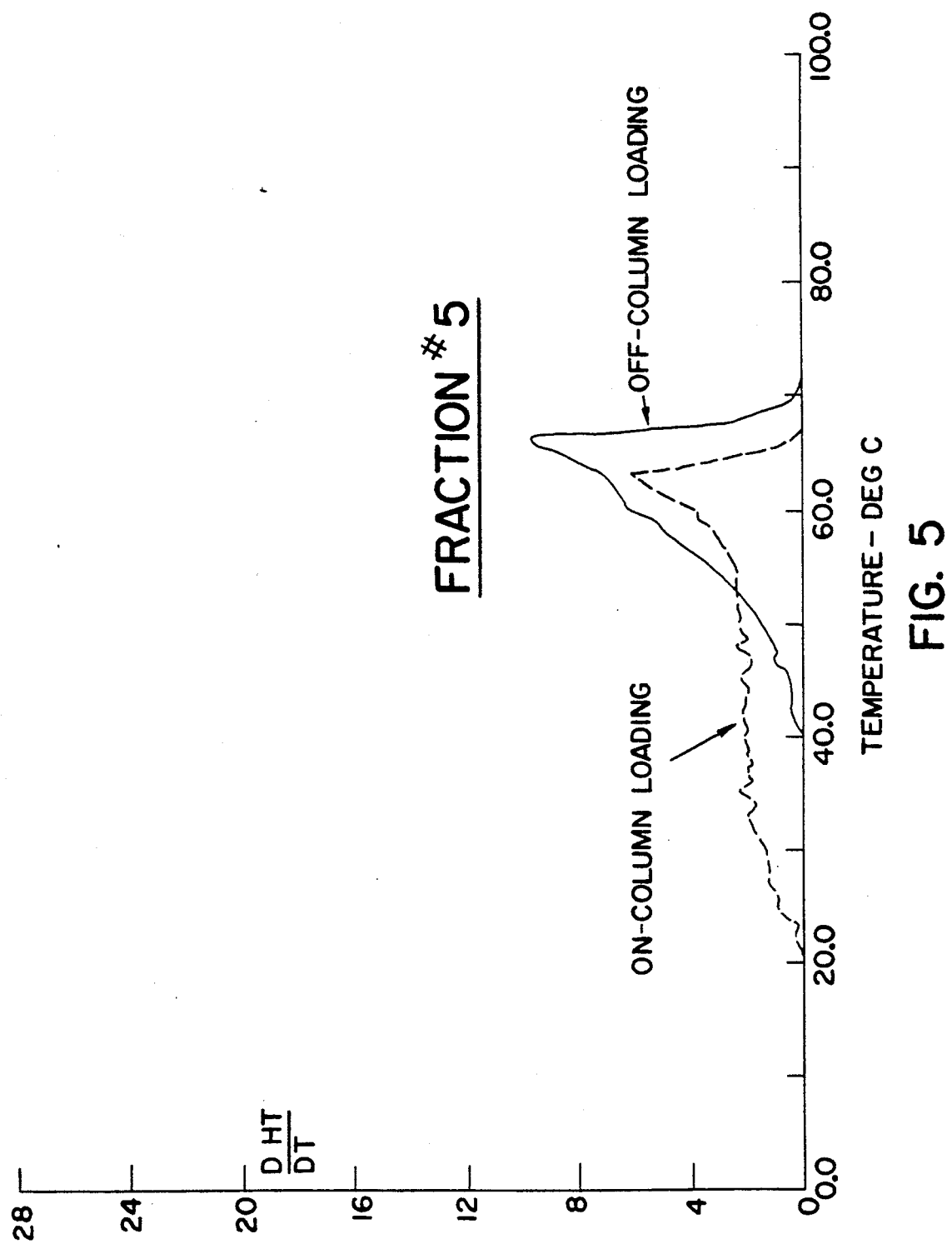
FIG. 5 is a graph of distribution data obtained for LLDPE fractions obtained by preparative TREF over the elution range 55°-60° C. The ordinate is the output from the detector (DHT/DT) and the abscissa is the elution temperature.
Figure 6:
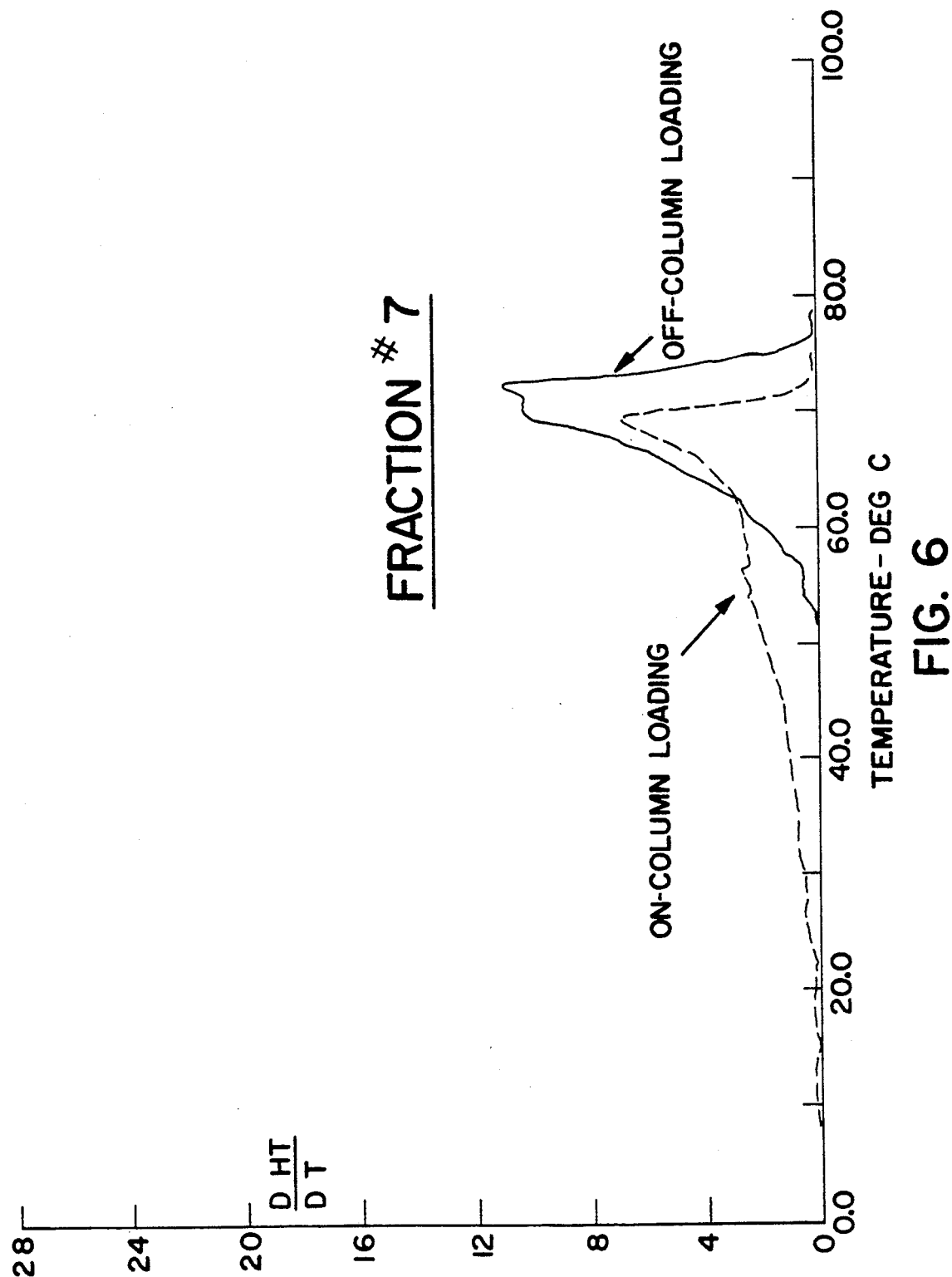
FIG. 6 is a graph of distribution data obtained for LLDPE fractions obtained by preparative TREF over the elution range 65°-69° C. The ordinate is the output from the detector (DHT/DT) and the abscissa is the elution temperature.
Figure 7:
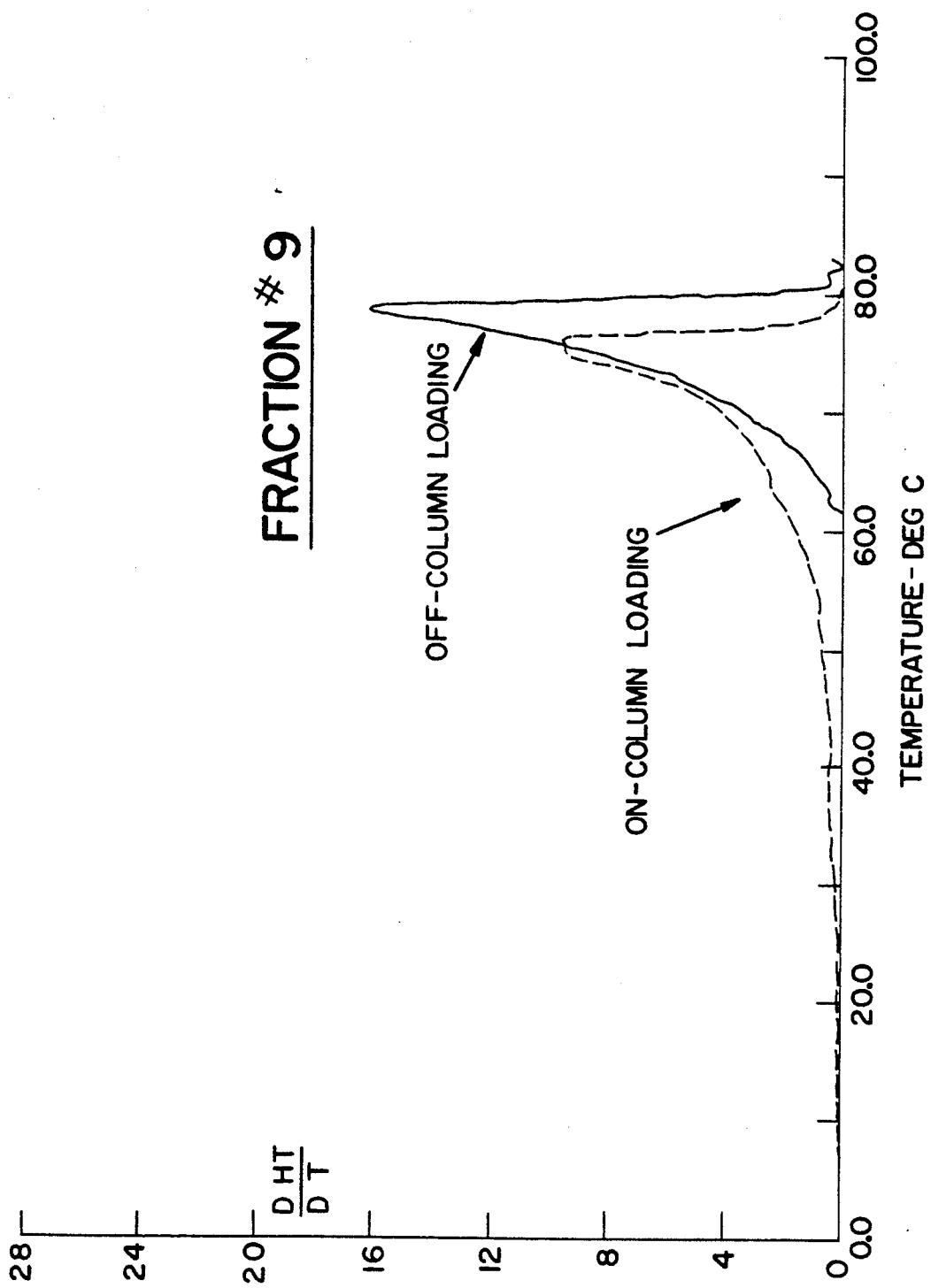
FIG. 7 is a graph of distribution data obtained for LLDPE fractions obtained by preparative TREF over the elution range 73°-77° C. The ordinate is the output from the detector (DHT/DT) and the abscissa is the elution temperature.
Figure 8:
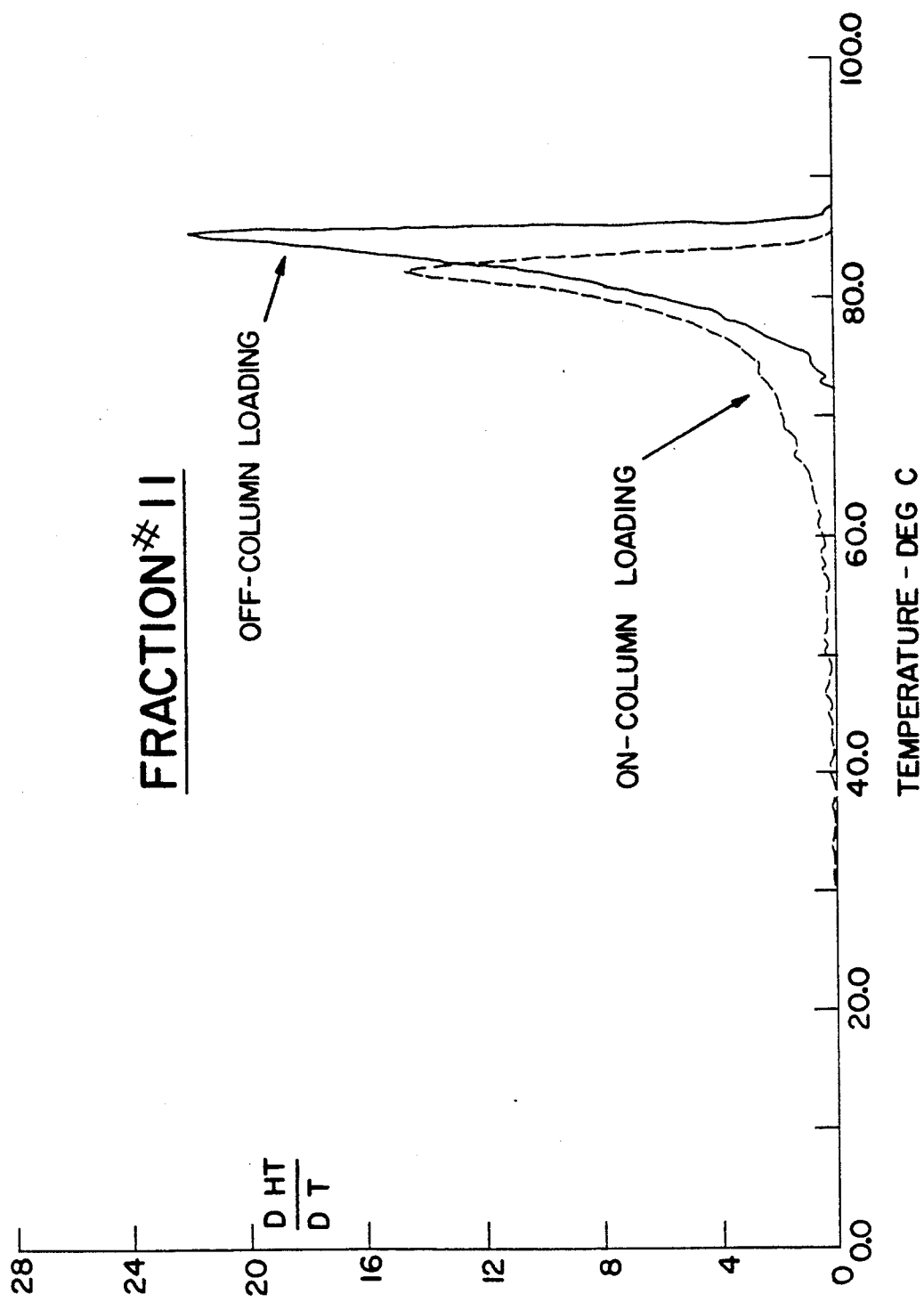
FIG. 8 is a graph of distribution data obtained for LLDPE fractions obtained by preparative TREF over the elution range 81°-85° C. The ordinate is the output from the detector (DHT/DT) and the abscissa is the elution temperature.
Figure 9:
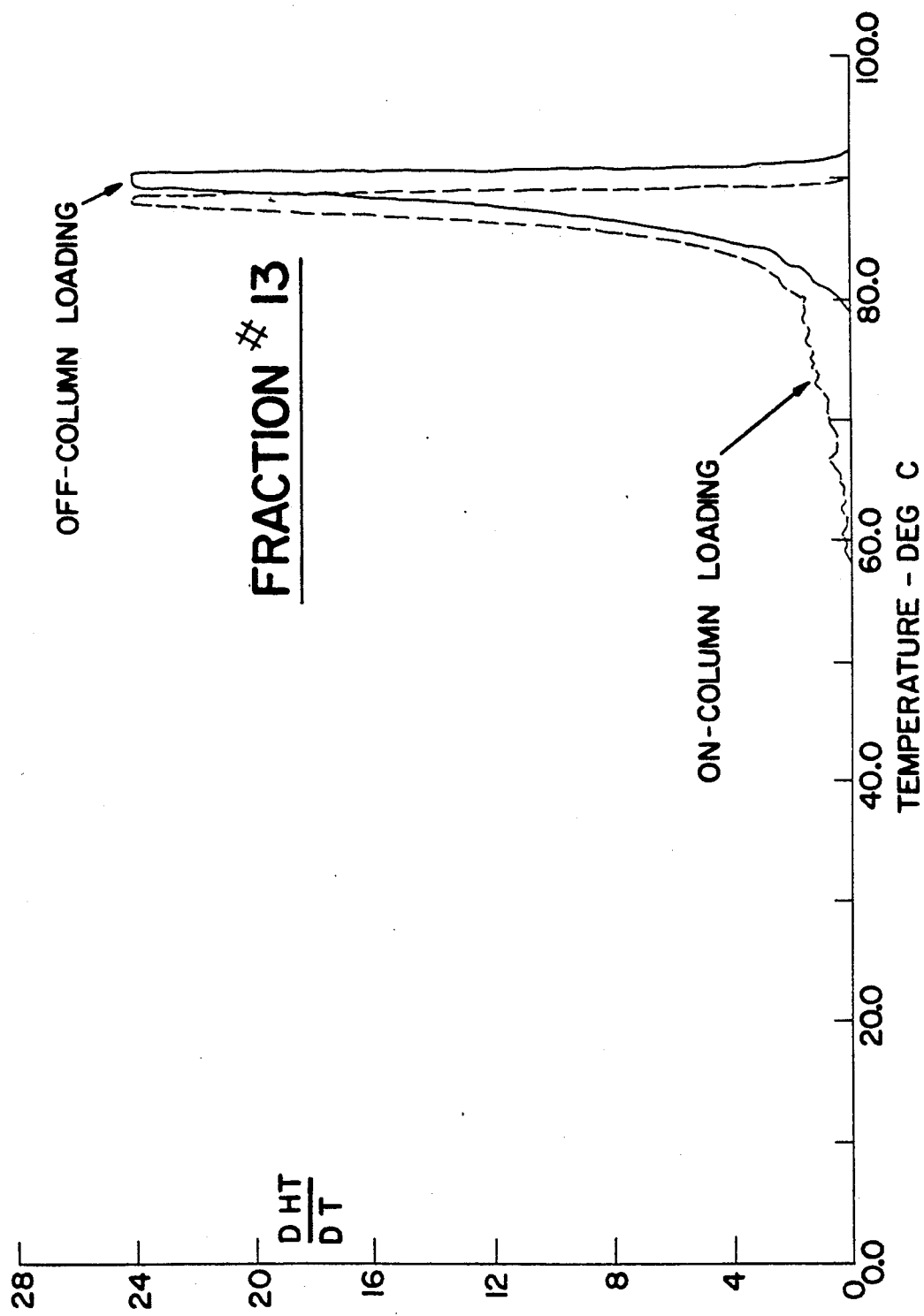
FIG. 9 is a graph of distribution data obtained for LLDPE fractions obtained by preparative TREF over the elution range 88°-90° C. The ordinate is the output from the detector (DHT/DT) and the abscissa is the elution temperature.

Plots of DHT/DT versus T were made for each fraction as described above. These plots clearly demonstrate the improved separation obtained with samples prepared in accordance with the improved procedure of the present invention and the reduced "tailing" effect compared to fractions obtained when the polymer samples were prepared in accordance with the prior art teachings. To illustrate the significant improvement, comparison plots obtained for identical fractions are set forth in FIGS. 4-9. FIG. 4 shows the curve obtained for fraction number 3 where the polymer sample was prepared in accordance with the invention (off-column loading) and the curve obtained for comparison fraction 3 (on-column loading). It is apparent from FIG. 4 that a significant improvement in the separation of the molecular species is obtained with the fraction collected from the sample prepared in accordance with this invention. A much sharper peak with a significantly reduced low temperature "tail" is obtained. Comparable improvements were obtained with the other fractions which were analyzed and are apparent from FIGS. 5-9. FIGS. 5-9 respectively provide comparative plots of DHT/DT versus T for Fraction 5 and Comparative Fraction 5; Fraction 7 and Comparative Fraction 7; Fraction 9 and Comparative Fraction 9, Fraction 11 and Comparative Fraction 11; and Fraction 13 and Comparative Fraction 13.

Figure 10:
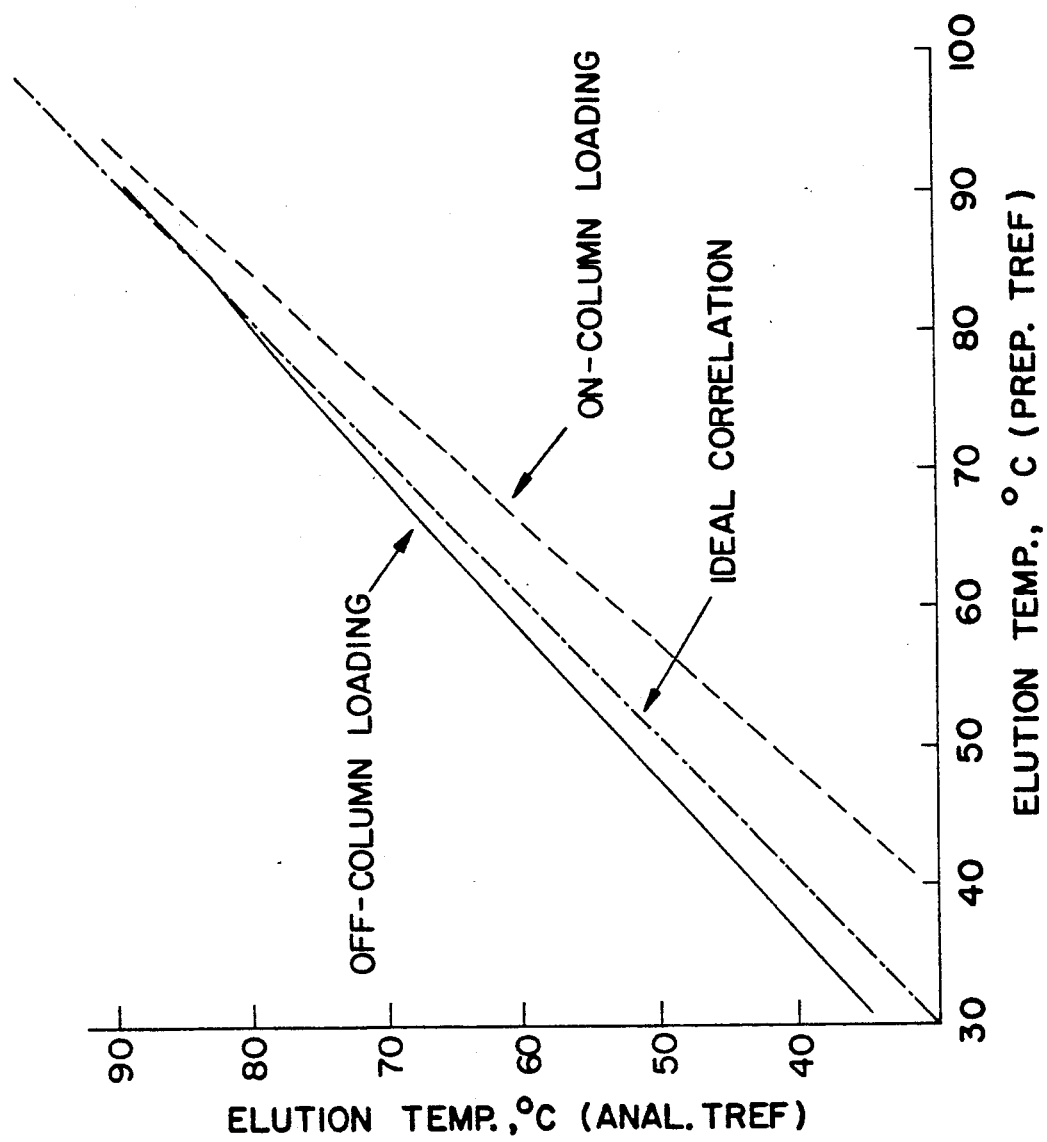
FIG. 10 is a plot showing the improved correlation (compared to the ideal) obtained utilizing the improved procedure of the present invention.

The data obtained from fraction analysis using analytical TREF can be summarized in a manner which will illustrate the improvement resulting from off-column crystallization. In FIG. 10 a plot is shown of the actual elution temperature during preparative TREF (the midpoint of each temperature step or range) and the temperature at which each fraction elutes driving analytical TREF. In a perfect fractionation the temperature at which the polymer species elute should be identical in both preparative and analytical TREF and should correspond to the temperature used in the preparative TREF. The plot indicates that off-column crystallization leads to a correlation much more close to the ideal than is obtained by the normal on-column loading technique. The much lower elution temperature observed in analytical TREF from the latter loading technique reflects the poorer separation and excessive low temperature tailing. The elution temperature by analytical TREF is obtained as the temperature at which 50% of material has eluted (i.e. temperature corresponding to 50 in the Cum Ht PCT column in Table 1).

We claim:

1. In a process for fractionating a polymer containing crystallinity wherein said polymer is precipitated from a polymer solution over a cooling temperature gradient as a function of its crystallizability and subsequently eluted with an organic solvent from a packed column over a heating temperature gradient in successive fractions, to increase the fractionation efficiency, the improvement comprising crystallizing the polymer outside the column and in the absence of column packing material from a solution containing less than 2% by weight of the polymer and thereafter combining the crystallized polymer with a column packing material at a weight ratio of from 1:30 to 1:200.

2. The process of claim 1 wherein the crystallized polymer is dry-blended with the column packing material.

3. The process of claim 2 wherein the column packing material is 15 to 300 micron diatomaceous earth.

4. The process of claim 1 wherein the crystallized polymer is slurried with the column packing material and filtered.

5. The process of claim 4 wherein the column packing material is 15 to 150 micron diatomaceous earth.

6. The process of claim 4 wherein the slurry is filtered in the column.

7. The process of claim 4 wherein a portion of the supernatant liquid is removed after crystallization of the polymer and prior to combining with the column packing material.

8. The process of claim 7 wherein a non-solvent is added to the supernatant liquid prior to removal of a portion of the supernatant liquid.

9. The process of claims 1, 2, 3, 4, 5, 6, 7 or 8 wherein the cooling temperature gradient is 1° C. to 10° C. per hour and the fractionation is conducted as a preparative temperature rising elution fractionation wherein the eluted polymer fractions are collected and the heating temperature gradient is carried out in stepwise increments, the temperature being increased to the next higher level after essentially all of the polymer is eluted at the lower temperature.

10. The process of claims 1, 2, 3, 4, 5, 6, 7 or 8 wherein the cooling temperature gradient is 1° C. to 10° C. per hour and the fractionation is conducted as an analytical temperature rising elution fractionation wherein the heating temperature gradient is continuously increased at a fixed rate and the eluted polymer continuously analyzed using an in-line detector.

* * * * *